(12) United States Patent
Nozawa et al.

(10) Patent No.: US 7,471,018 B2
(45) Date of Patent: Dec. 30, 2008

(54) LINEAR MOTOR AND MANUFACTURING METHOD OF LINEAR MOTOR

(75) Inventors: Hajime Nozawa, Hino (JP); Takayuki Narita, Tokyo (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 736 days.

(21) Appl. No.: 11/148,785

(22) Filed: Jun. 9, 2005

(65) Prior Publication Data

US 2005/0280316 A1    Dec. 22, 2005

(30) Foreign Application Priority Data

Jun. 21, 2004    (JP)    ............................. 2004-182078

(51) Int. Cl.
*H20K 41/00*    (2006.01)
(52) U.S. Cl. .............................. 310/12; 310/13; 310/15
(58) Field of Classification Search .................. 310/12, 310/13, 15
See application file for complete search history.

(56) References Cited

U.S. PATENT DOCUMENTS

| 6,979,920 | B2 * | 12/2005 | Reynolds et al. | ............... 310/54 |
| 7,352,088 | B2 * | 4/2008 | Qiu | ............................. 310/12 |
| 2006/0267415 | A1 * | 11/2006 | Qiu | ............................. 310/12 |

FOREIGN PATENT DOCUMENTS

JP    09-172767    6/1997

\* cited by examiner

*Primary Examiner*—Iraj A Mohandesi
(74) *Attorney, Agent, or Firm*—Lucas & Mercanti, LLP

(57) ABSTRACT

A linear motor comprise a pipe shaped member, and a stator stored in the pipe shaped member, the stator including plural magnets arranged in series so that adjacent poles of the plural magnets having the same magnetic pole are opposed each other, and a moving member capable of moving, the moving member being arranged to be opposed to an outer surface of the pipe shaped member, wherein the moving member includes an electro-magnetic coil and a coil holding member for holding at least a part of the outer surface of the electro-magnetic coil.

7 Claims, 13 Drawing Sheets

LINEAR MOTOR AND MANUFACTURING METHOD OF LINEAR MOTOR

RELATED APPLICATION

This application claims priority from Japanese Patent Application No. JP2004-182078 filed on Jun. 21, 2004, which is incorporated hereinto by reference.

FIELD OF THE INVENTION

The present invention relates to a linear motor particularly including a stator having plural magnets arranged in a series arrangement and a moving member arranged so that the moving member opposes to the outer surface of the rotor, the moving member being capable of moving, and the manufacturing method of the linear motor.

BACKGROUND

For example, it is proposed that a linear motor is used in a printing head and an exposing-scanning head of an office automation machine, and in parts which requires a linear moving accuracy, such as an exposing-scanning device in a medical apparatus.

Particularly, the shaft type linear motor which is disclosed on from page 1 to page 9 and in FIGS. 1-14 in Japanese Patent Application Open to Public No. H09-172767 is suitable for precise conveyance in the office automation machine from the viewpoint of speed performance and space saving. However, as shown in FIG. 18, the linear motor comprises stator 110 and moving member 120 arranged to linearly move along the outer surface of the stator 110. Moving member 120 comprises electro-magnetic coil 121 and bobbin 122 wound in the internal surface of electro-magnetic coil 121. A minute gap between bobbin 122 and the outer surface of pipe shaped member 111 is provided.

In a conventional linear motor, a moving member is wound around a bobbin. Accordingly, the distance between an electro-magnetic coil and a permanent magnet becomes long. Since the distance between the electro-magnetic coil and the permanent magnet is long, a larger permanent magnet is required to obtain predetermined thrust force.

The present invention is proposed to solve the problems described above, and to provide a linear motor and the manufacturing method of the linear motor to increase thrust force having a simple structure with lower cost.

SUMMARY

An embodiment of the present invention is structured as following in order to attain an object of the present invention.

An first embodiment of the present invention comprises a pipe shaped member and a stator stored in the pipe shaped member, the stator including plural magnets arranged in series so that adjacent poles of the plural magnets having the same magnetic pole are opposed each other and a moving member capable of moving, the moving member being arranged to be opposed to an outer surface of the pipe shaped member, wherein the moving member includes an electro-magnetic coil and a coil holding member for holding at least a part of the outer surface of the electro-magnetic coil.

An second embodiment of the invention is the linear motor of the first embodiment, wherein the coil holding member includes a concave winding section provided along a winding shape of the electro-magnetic coil and the concave winding section touches at least a part of the outer surface of the electro-magnetic coil.

An third embodiment of the invention is the linear motor of the second embodiment, wherein the coil holding member is structured by non-magnetic material.

An fourth embodiment of the invention is the linear motor of from the first embodiment to the third embodiment, wherein the electro-magnetic coil comprises a coil group having plural phases.

An fifth embodiment of the invention is a method of manufacturing of a linear motor including the steps of arranging stators in a pipe shaped member, the stator including plural magnets arranged in series so that adjacent poles having the same magnetic pole of the magnets are opposed to each other, providing a moving member having a coil holding member which holds a part of an outer surface of an electro-magnetic coil, and arranging the electro-magnet coil so that the electro-magnetic coil freely moves along the outer surface of the pipe shaped member.

An sixth embodiment of the invention is a method of claim 9, wherein the electro-magnetic coil is structured plural coils, each coil of the plural coils having a phase, and further comprises the steps of adhering at least an part of the coil holding member to the outer periphery surface of the electro-magnetic coil to hold the electro-magnetic coil after adjusting an internal diameters of the coils.

Based on these embodiments described above, the present invention has following effects.

According to the first embodiment of the invention, since the moving member includes a coil holding member holding at least a part of an outer surface of the electro-magnetic coil without providing a bobbin, it becomes possible to make a distance between the electro-magnetic coil and the magnet short and to increase thrust force with a simple structure.

According to the second embodiment of the invention, since the concave holding section along the winding shape of the electro-magnetic coil adheres a part of an outer surface of the electro-magnetic coil, it becomes possible to place the electro-magnetic coil the coil holding member with a simple structure.

According to the third embodiment of the invention, since the coil holding member is formed by non-magnetic material and when material having a good thermal-conductivity forms the holding member, it is possible to radiate generated heat of the electro-magnetic coil.

According to the fourth embodiment of the invention, since the electro-magnetic coil is a group of coils having plural phases, after adjusting the internal diameter of the group of coils and adhering coils each other, a part of the outer surface of the coil is adhered to the half cylindrical concave holding member, the accuracy of assembling is improved.

According to the fifth embodiment of the invention, since the moving member is structured by holding at least a part of an outer periphery surface of the electro-magnetic coil into the coil holding member and the electro-magnetic coil is arranged so that the electro-magnetic coil freely moves along the outer periphery surface of the pipe shaped member, the distance between the electro-magnetic coil and the magnet can be short, and it becomes possible to increase force by a simple structure with low-cost.

According to the sixth embodiment of the invention, since after adjusting the internal diameter of the coils having plural phases and adhering the coils each other, at least a part of the outer periphery surface of the electro-magnetic coil is adhered to the coil holding member, it becomes possible to assemble the coils without stepping differences in the internal diameter based on a dimensional error of the coil.

DETAILED DESCRIPTION OF PREFERRED EMBODIMENT

A linear motor and a method of manufacturing the linear motor of the invention will be explained below. However, the present invention is not limited to the embodiment of the invention. The embodiment of the invention shows the preferred embodiment of the invention. However, the present invention is not limited to the embodiment.

Figure 1A:
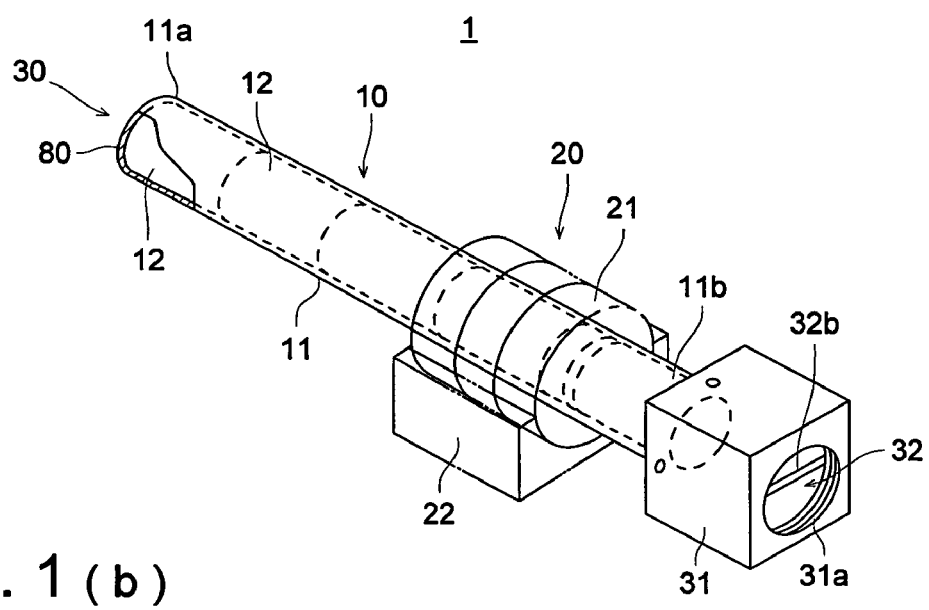
FIGS. 1(a) and 1(b) illustrate a linear motor.
Figure 1B:
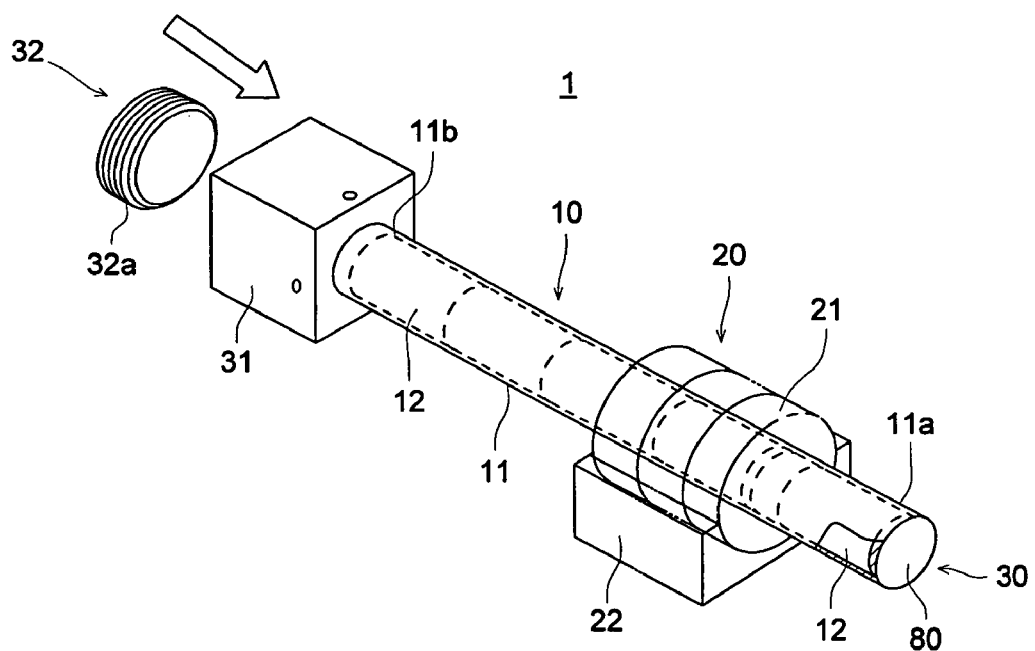
Figure 2:
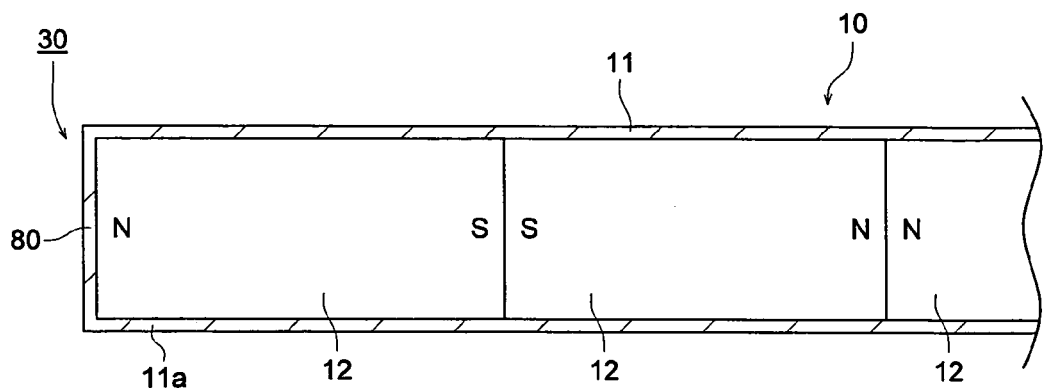
FIG. 2 illustrates a cross sectional view of one end of the liner motor.
Figure 3:
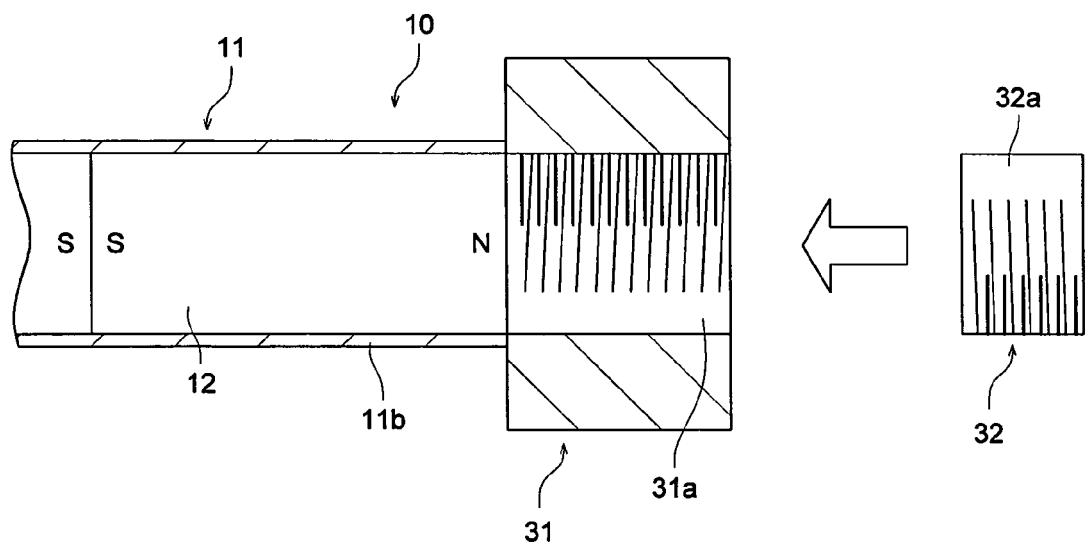
FIG. 3 illustrates a cross sectional view of the other end of the linear motor.

FIGS. 1(a) and 1(b) illustrate a linear motor. FIG. 2 illustrates a cross sectional view of one end of a liner motor. FIG. 3 illustrates a cross sectional view of the other end of the linear motor.

Linear motor 1 which is an embodiment of the present invention comprises a stator 10 fixed by a holding member (not shown) and moving member 20 capable of moving straight along the outer surface of stator 10.

Stator 10 comprises pipe shaped member 11 and plural magnets 12 stored in the pipe shaped member 11. Plural magnets 12 stored in the pipe shaped member 11 are arranged so that adjacent magnets closely contact each other.

Moving member 20 comprises electro-magnetic coil 21 and coil holding member 22 holding at least a part of the outer surface of electro-magnetic coil 21. A coil group having plural phases structures electro-magnetic coil 21. However, it is not limited to this. In this embodiment, a coil group having three phases is used.

A minute gap is provided between the internal surface of electro-magnetic coil 21 and the outer periphery surface of pipe shaped member 11. Pipe shaped member 11 and electro-magnetic coil 21 does not necessary slide each other. How to set the number of coil turn of electro-magnetic coil 21 is determined so that the more than target thrust force is obtained and the total voltage drop made by voltage drop of the linear motor and the voltage drop of a driving circuit becomes less than the voltage of a power supply. It is preferable that the appropriated number of the coil turn and the diameter of the coil are determined based on the method described above.

Pipe shaped member 11 has regulating structure 30 for preventing magnet 12 from coming out from edge 11a of pipe shaped member 11, and attaching-block member 31 at the other edge 11b. Regulating structure 30 of the embodiment is a structure for sealing pipe member 11 by placing a cap 80 at edge 11a of pipe shaped member 11, which is formed together with pipe shaped member 11. However, it is possible to seal pipe shaped member 11 by welding or adhering a separate member for forming a cap to pipe member 11. With regard to the regulating structure, it is not limited to a special structure as long as it prevents magnet 12 from coming out from pipe shaped member 11.

Attaching-block member 31 includes female screw section 31a. Plural magnets 12 are inserted from female screw section 31a in series from the other edge 11b of pipe shaped member 11 so that the same polarity of plural magnet 12 being adjacent to each other oppose face to face to store stator 10. Male screw section 32a of holding member 32 screws holding member 32 to female screw section 31a of attaching block member 31. Holding member 32 includes a tool matching groove 32b on the top of holding member 32. A tool (not shown) screws holding member 32 into female screw section 31a of attaching-block member 31. As a result, magnets 12 are held in pipe shaped member 11. Moving member 20 is freely arranged along the outer periphery surface from edge 11a of pipe shaped member 11.

As described above, plural magnets 12 are inserted to store stator 10 into pipe shaped member 11 having a regulating structure at edge 11a, from the other edge 11b so that the same polarity of magnets 12 opposes each other between adjacent magnets 12, and holding member 32 provided in the other section 11b holds magnets 12. This method of holding magnets 12 can remove the center axis and simply and securely holds magnet 12 inside pipe shaped member 11 without rattling and dropping out plural magnets 12 from pipe shaped member 11.

The shape of magnet 12 is cylindrical. Since it is not necessary to provide a through hole as a conventional method, manufacturing cost of magnets 12 can be reduced. With regard to the material for magnets 12, rare-earth magnet having large magnetic flux density is preferable. Particularly, as for rare earth magnet, neodymium magnet, for example, neodymium-iron-boron (Nd—Fe—B magnet) is preferable, by which more higher thrust force can be obtained comparing with other magnets.

With regard to the material of pipe shaped member 11, it is formed by non-magnetic material, such as aluminum alloy, cupper alloy and non-magnetic stainless steel, etc. It is preferable that pipe shaped member 11 is formed thin so as to not to decrease magnetic field which affects moving member 20.

For an example, pipe shaped member is formed by stainless steel having a thickness of about 1 mm.

Figure 4:
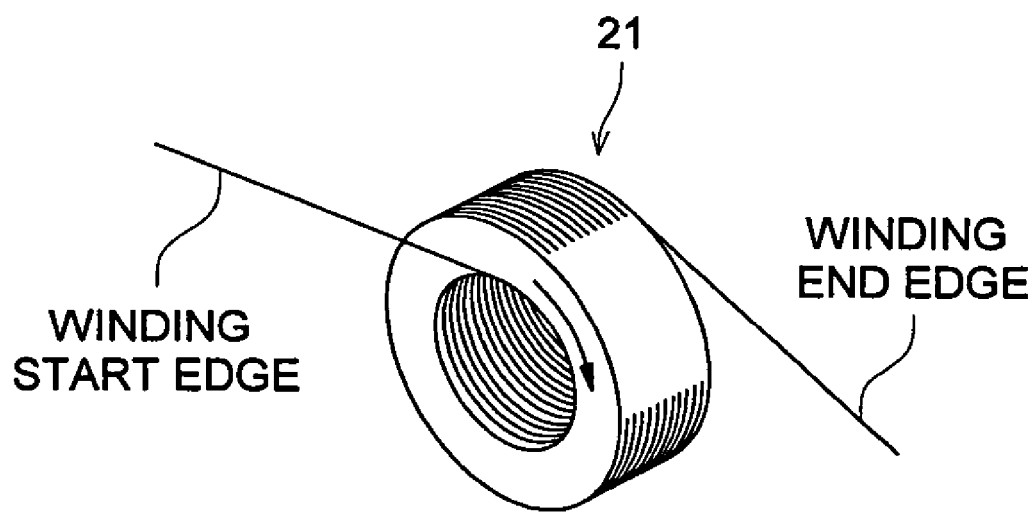
FIG. 4 illustrates a winding process of an electro-magnet coil corresponding to one phase.
Figure 5:
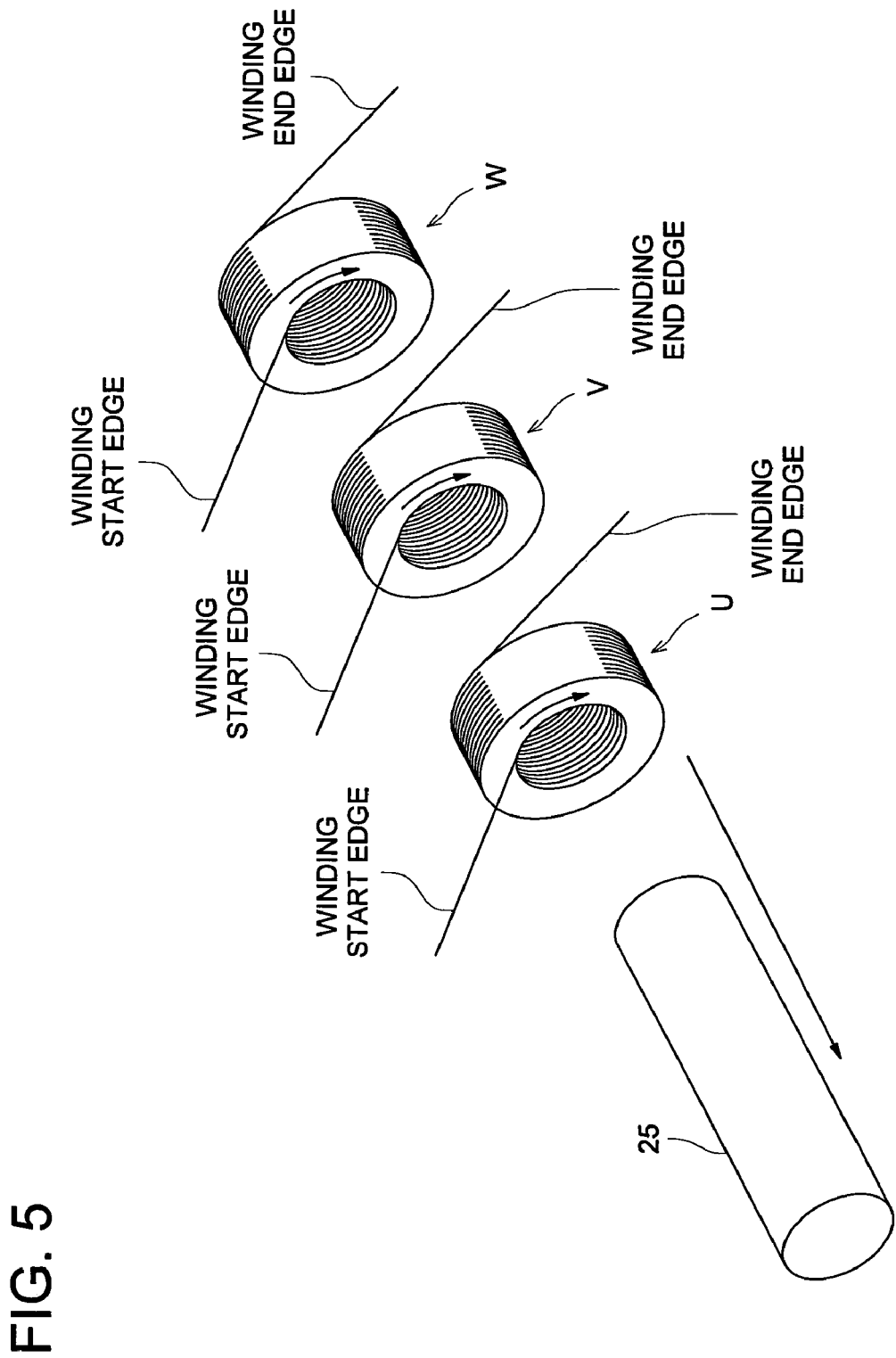
FIG. 5 illustrates a winding process of an electro-magnetic coil corresponding to three phases.
Figure 6:
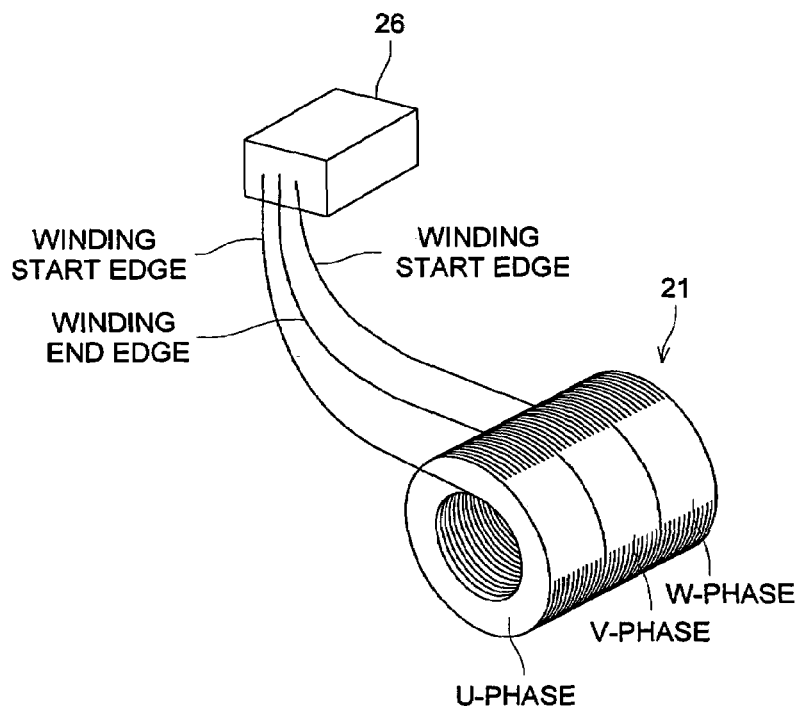
FIGS. 6(a) and 6(b) illustrate a wiring process of an electro-magnetic coil.
Figure 6:
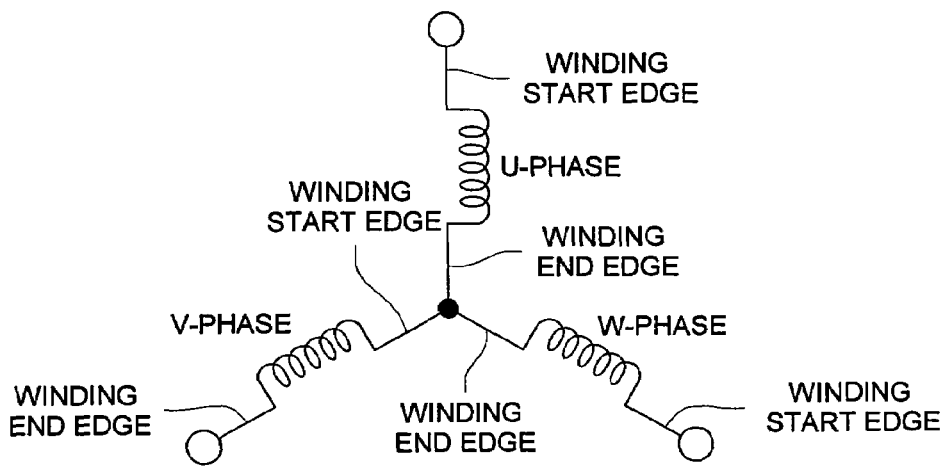
Figure 7:
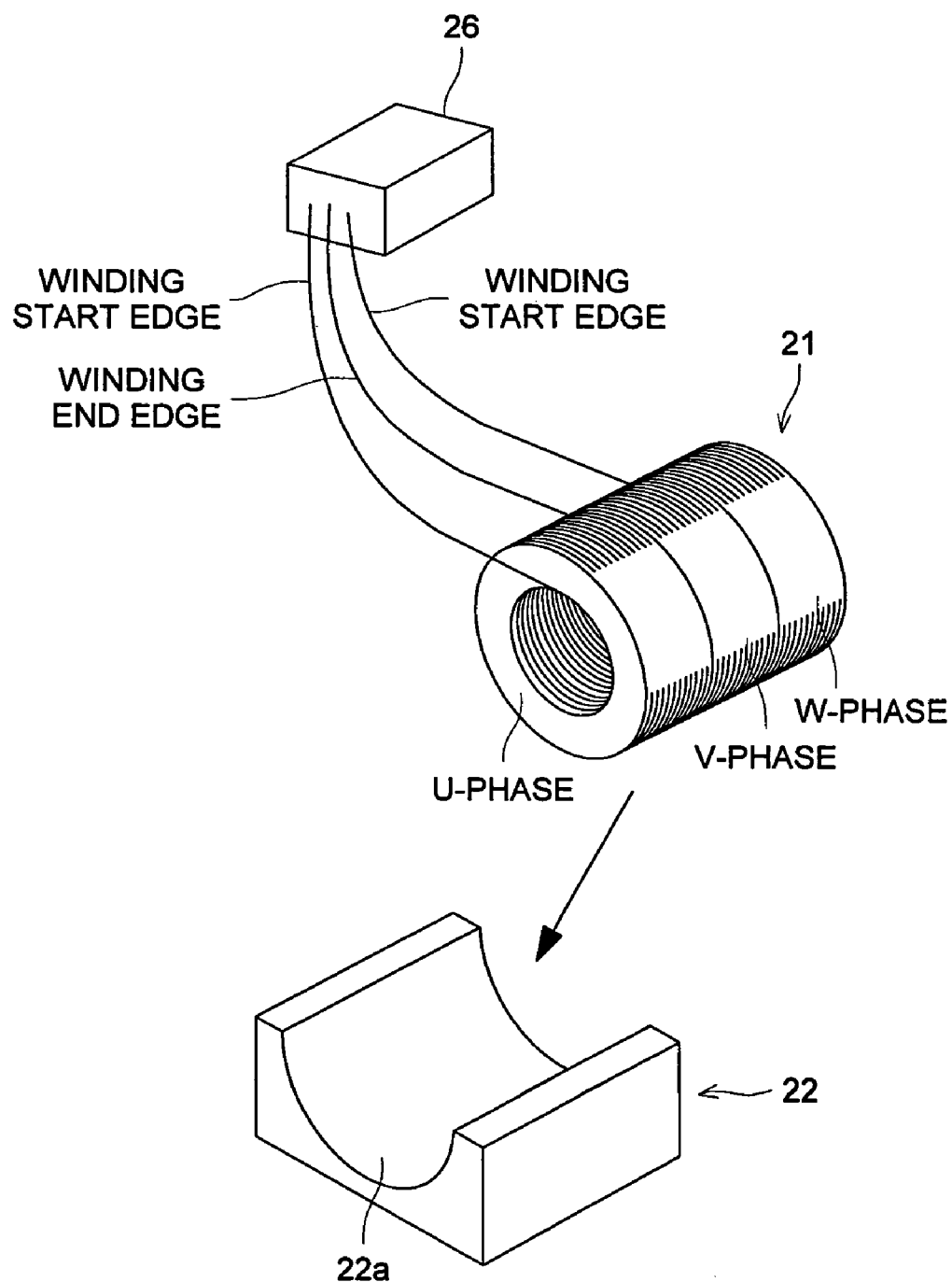
FIG. 7 illustrates a state when attaching the electro-magnetic coil to the coil holding member.
Figure 8:
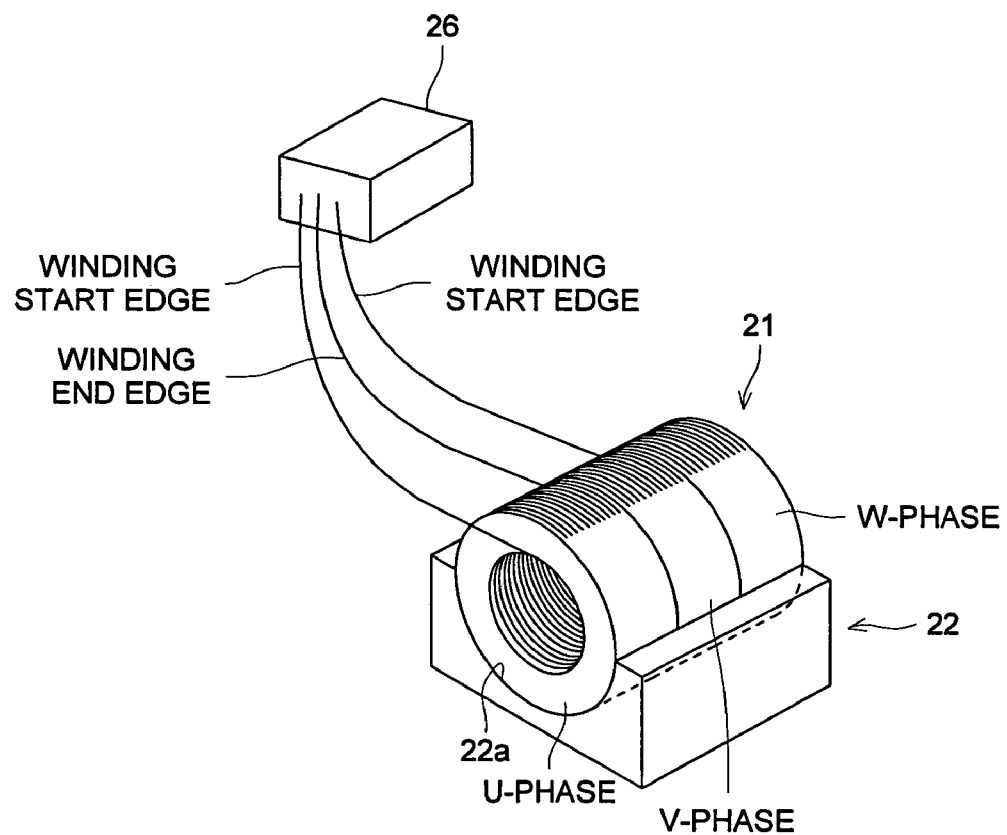
FIG. 8 illustrates a state when attaching the electro-magnetic coil to the coil holding member.
Figure 9:
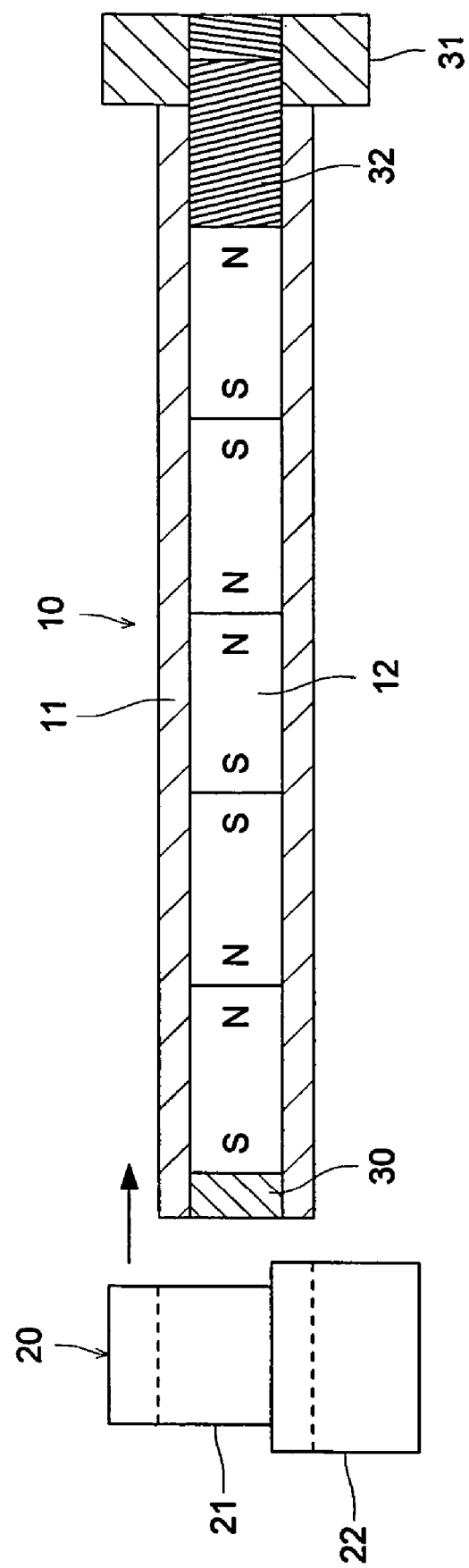
FIG. 9 illustrates a state when attaching the coil holding member having an electro-magnetic coil onto a pipe shaped member.

Next, an embodiment of a manufacturing process of the linear motor of the invention will be described below by using FIGS. 4-9. FIG. 4 illustrates a winding process of an electro-magnet coil corresponding to one phase. FIG. 5 illustrates a winding process of an electro-magnetic coil corresponding to three phases. FIGS. 6(a) and 6(b) illustrate a wiring process of an electro-magnetic coil. FIG. 7 illustrates a state when attaching an electro-magnetic coil to a coil holding member. FIG. 8 illustrates a state when attaching an electro-magnetic coil to a coil holding member. FIG. 9 illustrates a state when attaching the coil holding member having an electro-magnetic coil onto a pipe shaped member.

In FIG. 4, which illustrates a coil manufacturing process, the coil of electro-magnetic coil 21, which corresponds to a phase is wound. An automatic coil-winding machine is used to wind the coil corresponding to a phase. It is preferable that the width of the coil corresponding to one phase is substantially equal to one third of the width of the magnet. The number of coil is equal to the number of required phase. In this embodiment, three coils are wound, which corresponds to three phases, U, V and W.

In FIG. 5 illustrating a coil manufacturing process, the coils corresponding to phases U, V and W are connected. In order to connect these three coils corresponding to phases U, V and W, shaft shaped member (tool) 25 having a diameter substantially equal to the internal diameter of the coil is inserted into these three coils corresponding to U, V and W, and adhered each other. The internal diameter positions of these three coils corresponding to phases U, V and W are adjusted by shaft shaped member 25. In this embodiment, one pair of three coils corresponding to phases U, V and W is shown. However, two pairs of three coils which corresponds three phases and three pairs of three coils which corresponds to three phases are also applicable.

In FIGS. 6(a) and 6(b) illustrating a coil manufacturing process, three coils corresponding to phases U, V and W are wired. Winding-end edges of U-phase and W-phase and a winding-start edge of V-phase are connected by soldering and rest of edges are connected to connector 26 via connector 1-pin, connector 2-pin and connector 3-pin. Then shaft shaped member (tool) 25, which is located in the center portion of the coils is removed.

In FIGS. 7 and 8 illustrating coil manufacturing processes, coil holding member 22 holds a part of outer periphery surface of electro-magnetic coil 21 which has been wired. The assembly of moving member 20 finishes after adhering a part of outer periphery surface of electro-magnetic coil 21 to concave holding section 22a of coil holding member 22 having a half cylindrical shape, which is formed along the winding shape of the electro-magnetic coil. Coil holding member 22 is formed by non-magnetic material. Electro-magnetic coil 21 is a coil group having plural phases. Since after adjusting the position of plural coils corresponding to plural phases are adjusted and adhered, the plural coils are adhered to concave holding section 22a of coil holding member 22, the assembly accuracy can be improved.

In FIG. 9 illustrating a final assembly process of the linear motor, linear motor 1 is assembled and finished as following. Stator 10 is formed so that plural magnets 12 are arranged in pipe shaped member 11 so that adjacent magnets 12 arranged in series are opposed each other with the same polarity. Then moving member 20 which has been formed by holding a part of an outer periphery surface of electro-magnetic coil 21 onto coil holding member 22 as shown in FIGS. 4-8, is arranged so that electro-magnetic coil 21 freely moves along the outer surface of pipe shaped member 11.

According to the embodiment, moving member 20 having coil holding member 22 is provided so that a part of outer periphery surface of electro-magnetic coil 21 is held by coil holding member 22 without a bobbin. Accordingly, the distance between electro-magnetic coil 21 and magnet 12 can be short. As a result, it becomes possible to increase thrust force with a simple structure and low cost.

Further, coil holding member 22 includes concave holding section 22a, which adheres a part of outer periphery surface of electro-magnetic coil 21. As a result, coil holding member 22 can hold electro-magnetic coil 21 with a simple structure.

Figure 10:
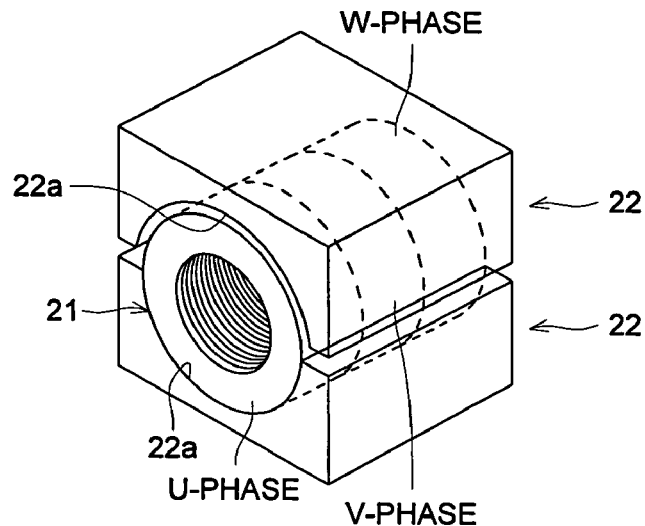
FIG. 10 illustrates a state when attaching the coil holding member of another embodiment onto an electro-magnetic coil.
Figure 11:
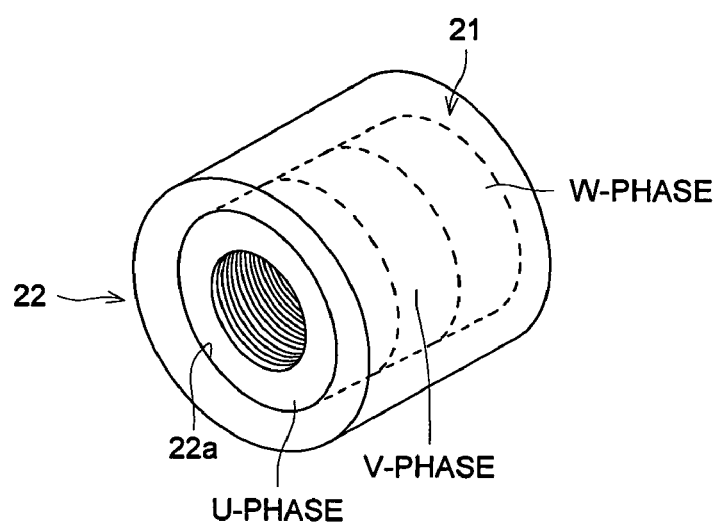
FIG. 11 illustrates a state when attaching the coil holding member of another embodiment onto an electro-magnetic coil.
Figure 12:
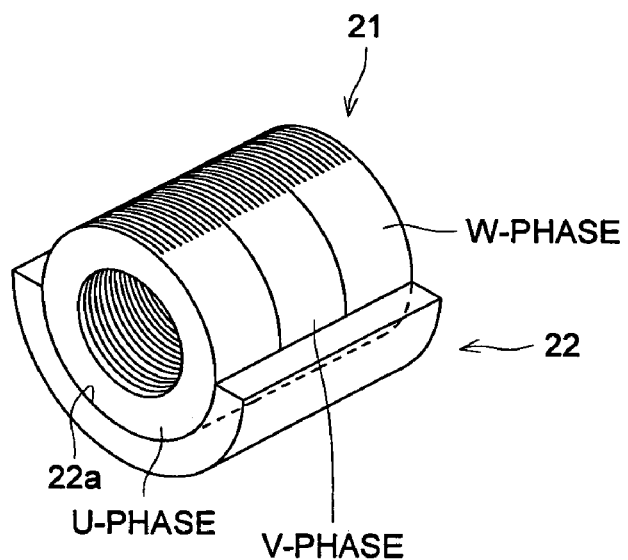
FIG. 12 illustrates a state when attaching the coil holding member of another embodiment onto an electro-magnetic coil.

The shape of coil holding member 22 is not limited to this embodiment. For example, a pair of half cylindrical shape of concave holding members 22a(s) shown in FIG. 10 is applicable. Further, the shape of coil holding member 22 can be a cylindrical shape as shown in FIG. 11 or a part of the cylindrical shape as shown in FIG. 12. A structure of coil holding member 22 can be applicable as long as the structure can fix a part of outer periphery surface of electro-magnetic coil 21 and hold electro-magnetic coil 21.

Coil holding member 22 is not limited to this embodiment as long as the coil holding member 22 is formed by a non-magnetic material. However, when coil holding member 22 is formed by a material having a good thermal conductivity, heat generated by electro-magnetic coil 21 can be radiated through coil holding member 22. For example, it is preferable that coil holding member 22 is formed by aluminum as a non-magnetic material.

Figure 13:
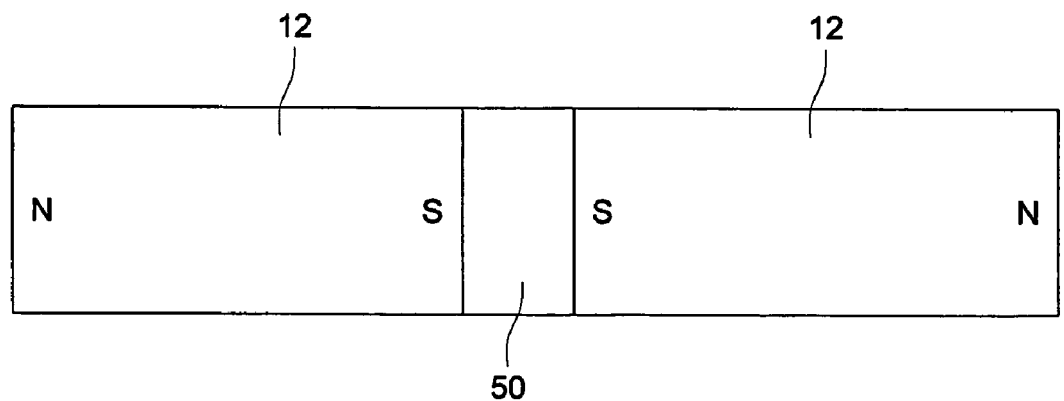
FIG. 13 illustrates a main cross sectional view of soft magnetic material arranged between adjacent magnets.

In this embodiment, as illustrated in FIG. 13, soft magnetic material 50 is placed between adjacent magnets 12. With regard to soft magnetic material 50, iron is used as a soft magnetic material. It is preferable that soft magnetic material 50 is provided between adjacent magnets 12 to suppress magnetic repulsive force and to increase the amount of leaking magnetic fluxes to outside, in other words, to in increase thrust force. It is preferable that the length of soft magnetic material 50 is not more than one tenth of a magnetic pole pitch. When the length of soft magnetic material 50 is set more than one tenth of a magnetic pole pitch, leaking magnetic fluxes decrease. As a result, the effect becomes little. The length of magnets of both sides of soft magnetic material 50 is not necessarily to be the magnetic pole pitch length. When the length of pipe shaped member 11 is determined, in order to adjust the total length, the length of a magnet placed both sides of the soft material can be changed in length from others.

Figure 14:
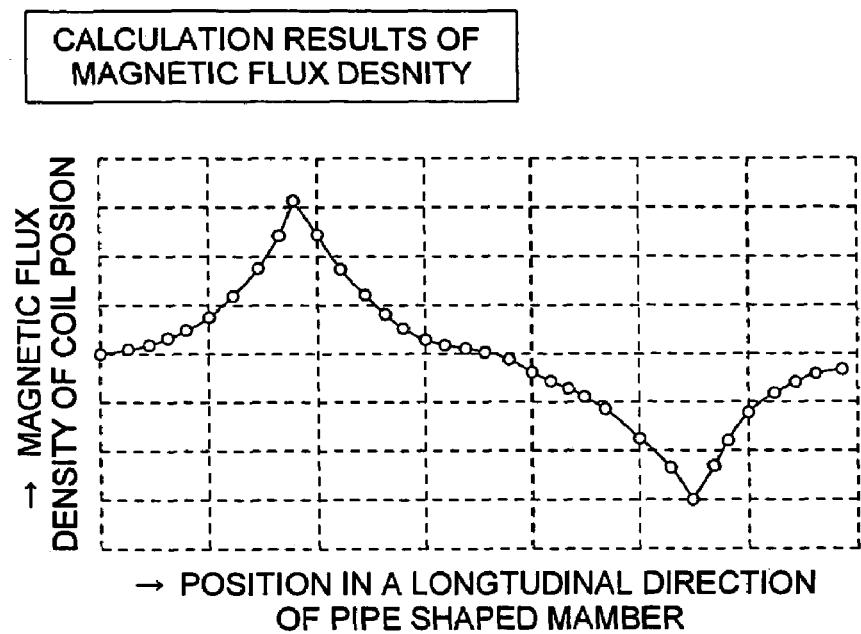
FIG. 14 illustrates a graph showing calculation results of magnetic flux densities.
Figure 15:
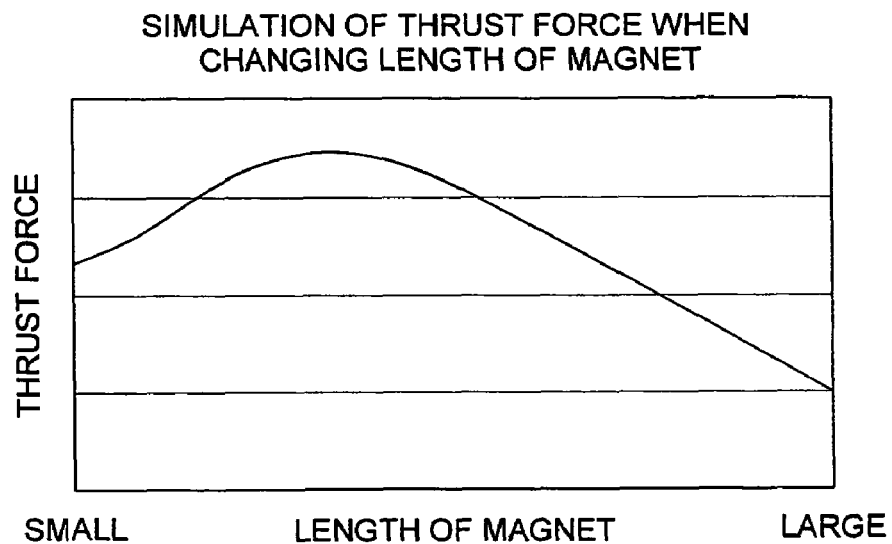
FIG. 15 illustrates a graph showing the simulation of thrust force when changing the length of a magnet.
Figure 16:
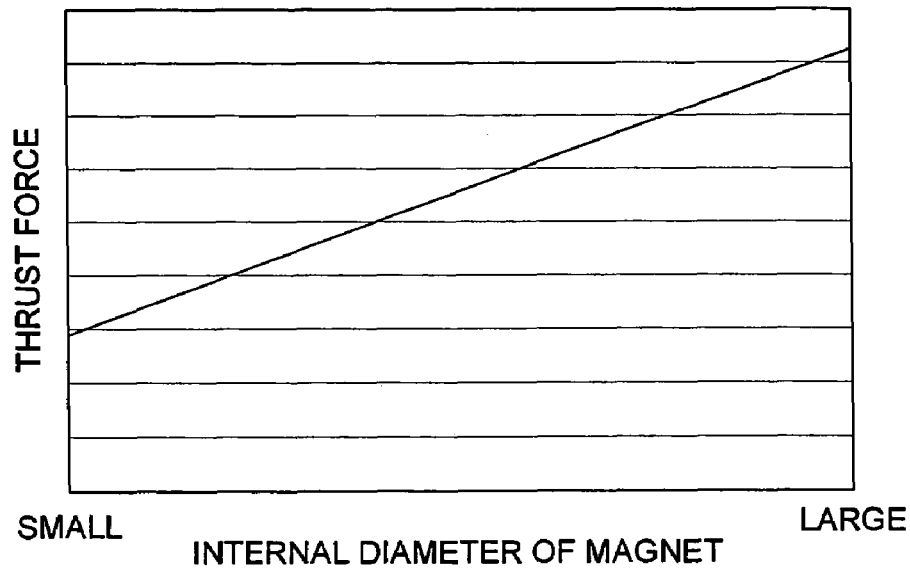
FIG. 16 illustrates a graph showing the simulation of thrust force when changing an outer diameter of a magnet.

In this embodiment, as shown in FIGS. 14-17, it is possible to design a linear motor having a requested thrust force by varying respective parameters to decrease the amount of usage of magnets. FIG. 14 illustrates a graph showing calculation results of magnetic flux densities. FIG. 15 illustrates a graph showing the simulation of thrust force when changing the length of a magnet. FIG. 16 illustrates a graph showing the simulation of thrust force when changing an outer diameter of a magnet.

This method is a method which is generally used when a linear motor is designed. There is irreversible demagnetization in a magnet. Since the magnet is placed in a direction in which magnetic fluxes repulses, permeance goes down.

Namely, when a magnet is placed in a magnetic field, the magnet is magnetized. And magnetic fluxes are emitted out from the magnet after removing the outer magnetic field. The amount of magnetic fluxes is a residual magnetic flux density (Br). In reality, since the magnet is placed in a magnetic field where the direction of magnetic fluxes are reversely applied to the magnet (reverse magnetic field) comparing with the direction of magnetic flux when magnetization is conducted, only magnetic flux density, which is smaller than residual magnetic flux density Br is emitted from the magnet. Reverse magnetic field becomes large as a North-pole and a South-pole approach to each other. Namely, as a dimensional ratio of a magnet (length/diameter) becomes small, the reverse magnetic field becomes large. Taking account this reverse magnetic field, when magnetic field which effectively works on the magnet is −Hd shown in FIG. 17, the magnet is supposed to emit magnetic flux density Bd which corresponds to H=−Hd on a B–H curve of the magnet (demagnetization curve).

Figure 17:
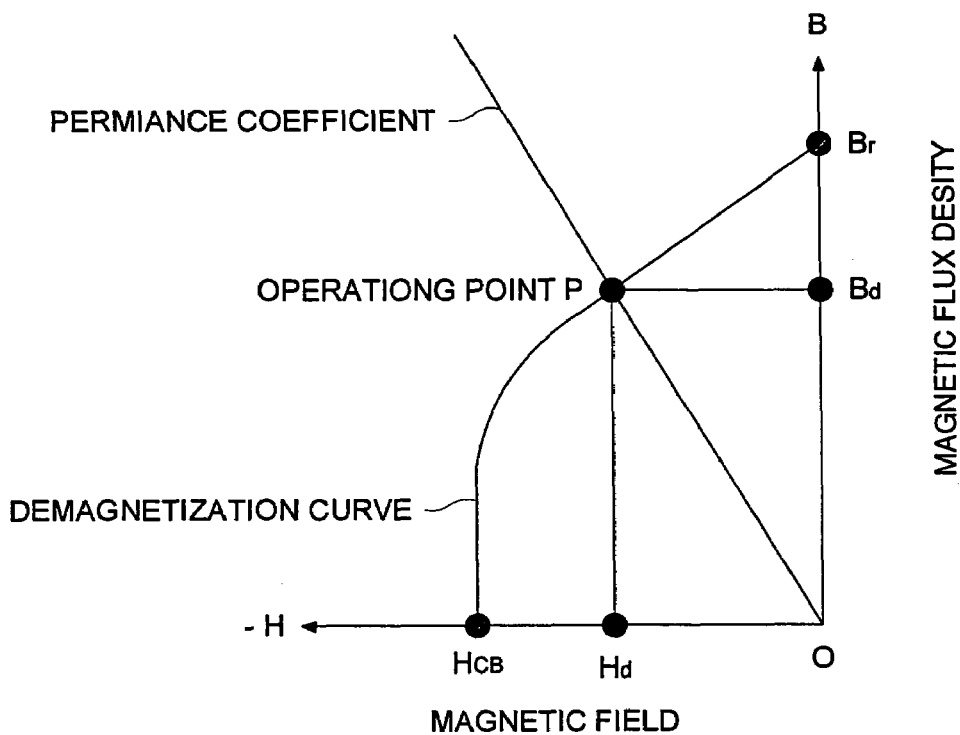
FIG. 17 illustrates an explanation of an operating point and a permeance coefficient.
Figure 18:
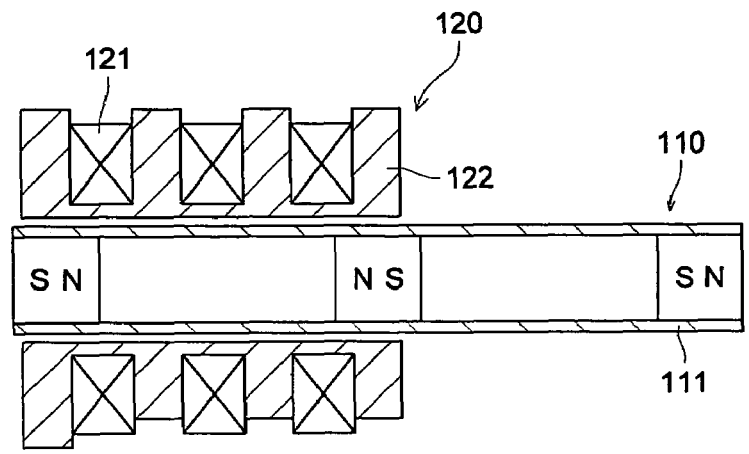
FIG. 18 illustrates a conventional linear motor.

Here, p=Bd/Hd is called permeance coefficient. Cross point P of a straight line having an inclination of Bd/Hd from an original point and B–H curve shown in FIG. 17 is called operating point P. Permeance means "a degree of penetration=a degree of passing easiness of magnetic flux". When magnetic flux corresponds to current, permeance corresponds to an electric conductance (current/voltage). Operating point P changes according to the shape of the magnet and a condition of around the magnet. For example, when assuming that an operating point in FIG. 17 after magnetization is on operating point P, and if a piece of iron is absorbed by the magnet, the effective magnetic field working on the magnet shifts in the direction toward the original point.

For example, when a magnet having small magnetic coercive force is used, since demagnetization occurs even in room temperature, a certain level of magnetic coercive force is required. The temperature when irreversible demagnetization occurs can be obtained by calculating the demagnetization temperature from the B–H curve of the magnet based on the calculation of permeance by the electro-magnetic field calculation software.

A rare-earth magnet is preferably used as a magnet. And a neodymium magnet is preferable as the rare-earth magnet. However as long as the magnet has enough magnetic coercive force and irreversible demagnetization does not occur in room temperature and the magnet has magnetic energy for required thrust force, the magnet is not limited to the magnet described above. When neodymium type of magnet is used, a rust problem occurs. Even though the magnet is placed inside pipe shaped member 11, when a cylindrical member is used to fix edge 11a of pipe shaped member 11, rust flies out from the cylindrical member and there is a possibility to affect apparatuses used in the system. Further, when rust occurs in a process from a magnet manufacturing process to an assembly process of linear motor 1, it causes a failure of the magnet. Accordingly, it is preferable that metal plate is applied on the magnet. For example, nickel plating and aluminum plating are popular. The kind of metal plating is not limited to a special kind.

A linear motor of the invention comprises a pipe shaped member and a stator stored in the pipe shaped member, the stator including plural magnets arranged in series so that adjacent poles having the same magnetic pole are opposed each other and a moving member capable of moving, the moving member being arranged to be opposed to an outer surface of the pipe shaped member, wherein the moving member includes an electro-magnetic coil and a coil holding member for holding at least a part of the outer surface of the electro-magnetic coil. Since, the distance between the electro-magnetic coil and the magnet can be short, it is possible to improve the thrust force with a simple structure and low cost.

What is claimed is:

1. A linear motor comprising:
 a pipe shaped member; and
 a stator stored in the pipe shaped member, the stator including plural magnets arranged in series so that adjacent poles of the plural magnets having the same magnetic pole are opposed each other; and
 a moving member capable of moving, the moving member being arranged to be opposed to an outer surface of the pipe shaped member,
 wherein the moving member includes an electro-magnetic coil and a coil holding member for holding at least a part of an outer surface of the electro-magnetic coil and the coil holding member includes a concave winding section provided along a winding shape of the electro-magnetic coil and the concave winding section adheres at least a part of the outer surface of the electro-magnetic coil.

2. The linear motor of claim 1,
 wherein the coil holding member is structured by non-magnetic material.

3. The linear motor of claim 1,
 wherein the coil holding member is structured by non-magnetic material.

4. The linear motor of claim 1,
 wherein the electro-magnetic coil comprises a coil group having plural phases.

5. The linear motor of claim 1,
 wherein the electro-magnetic coil comprises a coil group having plural phases.

6. The linear motor of claim 2,
 wherein the electro-magnetic coil comprises a coil group having plural phases.

7. The linear motor of claim 3,
 wherein the electro-magnetic coil comprises a coil group having plural phases.

* * * * *